Jan. 28, 1930.    M. GZUPKAYTIE    1,744,761
RIM BOLT
Filed July 5, 1928
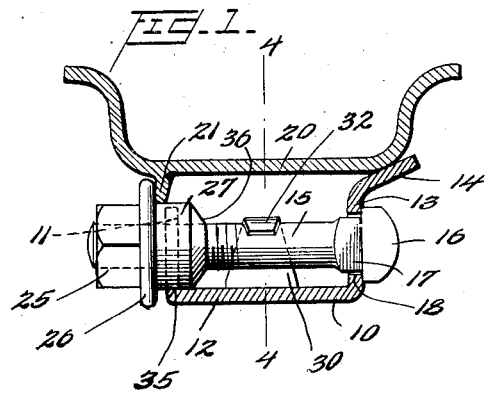
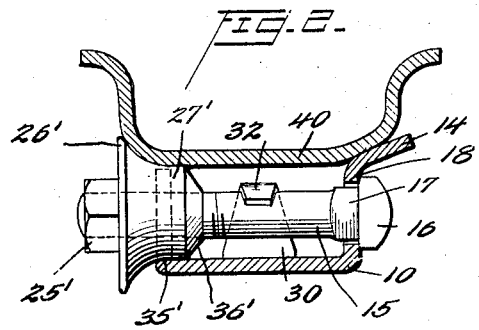
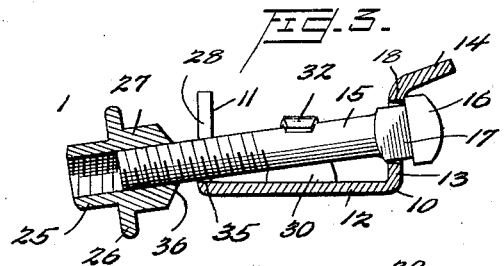
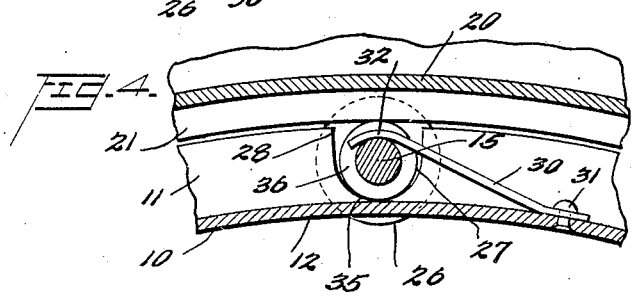
Inventor
Matt Gzupkaytie
By Watson, Crist, Morse & Grindle
Attorneys Patented Jan. 28, 1930

1,744,761

UNITED STATES PATENT OFFICE

MATT GZUPKAYTIE, OF BALTIMORE, MARYLAND

RIM BOLT

Application filed July 5, 1928. Serial No. 290,484.

This invention relates to rim bolts, and more particularly to devices of this character which are mounted in the felly of a wheel having a demountable rim, and which devices are provided with means to secure the rim in position on the wheel.

Various means have been proposed for retaining demountable rims, and perhaps the most popular of these has comprised a lug having a central aperture which fits over the rim bolt and under the nut carried thereby. The lug bears on the felly and projects outwardly to engage the rim, thus bridging the rim and the felly, and the nut serves to clamp the parts together. Heretofore, the nut and lug have been separately demountable, and in changing rims the nuts or lugs very often become lost. Furthermore, reassembling the lugs and nuts for each individual bolt is a tedious process, requiring considerable time.

It is an object of the present invention to provide means integral with the nut for retaining the demountable rim on the felly of the wheel.

Another object of the invention is to provide means for automatically retracting the rim retaining means when the nut is unscrewed.

A further object is to simplify and improve the construction and operation of devices of this character.

Other objects and features of novelty will be apparent as the following description proceeds as taken in conjunction with the accompanying drawings, in which:

Figure 1 is a radial cross section through the felly of a wheel having a demountable rim secured thereon according to my invention;

Figure 2 is a similar view showing my invention as adapted to retain a different type of demountable rim;

Figure 3 is a view showing the structure of Figure 1 with the nut retracted to permit removal of the rim; and Figure 4 is a cross section along the line 4—4 of Figure 1.

Referring more particularly to the drawings, the invention is illustrated in conjunction with a wheel adapted for demountable rims, and the felly of the wheel is indicated generally at 10. This felly is a circular metal channel, open at its outer surface and comprising an outer flange 11, over which the demountable rim is applied, a web portion 12 forming the bottom of the channel, and an inner flange 13, the outer rim 14 of which is bent inwardly forming a tapered seat to receive the demountable rim.

Passing through the felly 10, substantially centrally of the flanges 11 and 13, and normally parallel to the axis of the wheel, is a rim bolt 15. In the preferred form shown by way of example, this bolt has a smooth inner head 16 and a polygonal shank 17 which passes through a corresponding aperture 18 in the flange 13. The aperture 18 is slightly larger than the shank 17, sufficient to permit the bolt to swing therein, but not large enough to permit it to rotate.

One form of demountable rim for which my invention is adapted is indicated generally at 20 in Figure 1 and comprises a channel shaped member having outwardly flared flanges to retain the bead of a pneumatic tire. This type of rim has an inwardly projecting annular flange 21 which is provided as a seat for a retaining device.

A nut 25 is adapted to engage the outer threaded end of the bolt 15. This nut is provided with means for retaining the demountable rim on the felly, which in the preferred embodiment constitutes an annular flange 26 formed integral with the nut 25. Also integral with the nut 25 and the flange 26 is a sleeve portion 27 of such diameter as to rest on the inner surface of the web 12 when the flange 26 is in its normal position shown in Figure 1. The outer flange 11 of the felly is slotted as at 28 to permit the sleeve 27 to enter the interior of the channel felly. As shown in Figure 1, the flange 26 overlies the internal flange on the rim 20 and serves to hold it on to the felly when the parts are in the position shown.

It will be apparent from an inspection of Figure 1 that when the nut 25 is engaged by a wrench and the nut is unscrewed, the flange 26 and sleeve 27 will turn therewith. When the nut is unscrewed sufficiently to permit the end of the sleeve 27 to ride out of the slot 28, the bolt may pivot radially inwardly about the aperture 18 so that the outer end of the bolt will rest on the bottom of the slot 11. This will retract the flange 26 from the internal flange 21 of the rim so that the rim may be removed thereover.

Resilient means is provided to insure that the outer end of the bolt will move in a direction to retract the flange 26, which is illustrated for example as a flat leaf spring 30 riveted at one end as at 31 to the web 12, and has its outer end 32 curved to fit over the central portion of the bolt 15.

The bottom of the slot 28 is rounded as at 35, and the sleeve 27 terminates in a cam portion 36, which is adapted to engage the portion 35. With the rim applied to the felly and the rim and nut in the position shown in Figure 3, when the nut is turned the cam portion 36 will engage the seat 35 and ride thereover, thus automatically bringing the bolt back to normal position against the action of the spring 32, merely by the turning action of the nut. With this arrangement, therefore, neither the nut nor the retaining device need be entirely removed from the bolt, so that there is no need of disassembling and reassembling the rim retaining device. Furthermore, the spring 30 serves to automatically retract the retaining device 26 when the nut is unscrewed, and the cam portion 36 coacting with the seat 35 serves to automatically extend the retaining device 26 into position to engage the retaining rim 21. In applying the rim to the felly, the rim is fitted thereover until its inner edge engages the tapered flange 14 and seats thereagainst. Tightening the nut 25, by forcing the flange 26 against the flange 21 wedges the rim securely against the tapered seat 14.

The invention is slightly modified as shown in Figure 2, in order to accommodate a different type of demountable rim which is indicated at 40. The inner surface of this rim is entirely smooth, as there is no retaining flange such as shown at 21 in Figure 1. Accordingly the nut 25' is formed with an annular flange 26' preferably of slightly larger diameter than the flange 26 shown in Figure 1 and the sleeve portion 27' is formed as a surface of revolution fitting the curvature of the inner surface of the rim 40. With this exception the structure and operation is identical with that described in connection with Figure 1 and need not therefore be repeated in detail. It will be obvious that when the nut 25' is unscrewed, the sleeve 27' will ride out of the slot 28 and the spring 30 will cause the flange 26' to be retracted to permit removal of the rim 40. When the rim 40 is remounted and the nut 25 is tightened, the cam portion 36' engaging the seat 35' will cause the sleeve 27' to ride up into position so that its surface of revolution will fit against the outer surface of the rim 40 and securely hold it in position.

While two embodiments of the invention have been shown and described in great detail for the purposes of adequate disclosure, the invention is not limited to any of the details shown or described, but includes such embodiments of the broad idea as come within the scope of the appended claims.

Having thus described the invention, what is claimed as new and desired to be secured by Letters Patent is:

1. A device for securing demountable rims on the felly of a wheel, comprising in combination a rim bolt passing through said felly, a nut threaded on the outer end of said bolt, said felly having a radial slot to permit the outer end of said bolt to swing toward the center of the wheel when the nut is unscrewed to permit removal of the rim, and said nut having a cam portion engaging the bottom of said slot for causing the bolt to ride back into a position substantially parallel to the axis of the wheel when the nut is tightened.

2. In combination with a rim bolt mounted in the felly of a wheel, a nut having a sleeve adapted to enter a slot in said felly, and a flange adapted to project above the outer edge of said felly to retain a demountable rim, said sleeve having a tapered portion for causing said bolt to ride radially outward with respect to the felly when the nut is tightened.

In testimony whereof I hereunto affix my signature.

MATT GZUPKAYTIE.